(12) United States Patent
Sutton

(10) Patent No.: US 8,496,460 B2
(45) Date of Patent: Jul. 30, 2013

(54) PIPE EXTRUSION DIE FLOW PATH APPARATUS AND METHOD

(75) Inventor: Gerald S. Sutton, Hamilton, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 851 days.

(21) Appl. No.: 12/036,411

(22) Filed: Feb. 25, 2008

(65) Prior Publication Data

US 2008/0203607 A1 Aug. 28, 2008

Related U.S. Application Data

(60) Provisional application No. 60/903,286, filed on Feb. 26, 2007.

(51) Int. Cl.
*B29C 47/20* (2006.01)

(52) U.S. Cl.
USPC .......... 425/133.1; 425/192 R; 425/380; 425/466

(58) Field of Classification Search
USPC .......... 425/133.1, 192 R, 380, 381, 462, 425/466
See application file for complete search history.

(56) References Cited

U.S. PATENT DOCUMENTS

| | | | |
|---|---|---|---|
| 2,700,631 A | 1/1955 | Sussenbach et al. | |
| 2,753,596 A | 7/1956 | Bailey | |
| 2,877,150 A | 3/1959 | Wilson | |
| 2,888,954 A | 6/1959 | Gates | |
| 2,931,069 A | 4/1960 | McCormick | |
| 3,081,102 A | 3/1963 | Murray et al. | |
| 3,379,805 A | 4/1968 | Roberts | |
| 3,490,496 A | 1/1970 | Steams | |
| 3,538,209 A | 11/1970 | Hegler | |
| 3,573,871 A | 4/1971 | Warner | |

(Continued)

FOREIGN PATENT DOCUMENTS

| | | |
|---|---|---|
| DE | 1 278 734 | 9/1968 |
| DE | 1 704 718 | 7/1971 |

(Continued)

OTHER PUBLICATIONS

Foerst, Dr. Wilhelm, Ullmanns Encyklopädie der technischen Chemia, Urban & Schwarzenberg, Munchen, Berlin, Germany, pp. 52-53, 71-73, 1960.

(Continued)

*Primary Examiner* — Yogendra Gupta
*Assistant Examiner* — Joseph Leyson
(74) *Attorney, Agent, or Firm* — Finnegan Henderson Farabow Garrett & Dunner, L.L.P.

(57) ABSTRACT

A method and apparatus is provided for distributing material through a multilayer pipe extrusion die. A first flow passageway, having a first cross-sectional area and extending along a first flow direction, may be connected to a second flow passageway, having a second cross-sectional area substantially the same as the first cross-sectional area of the first flow passageway, to provide a second flow direction different from the first flow direction of the first flow passageway. A conical passageway may extend from the second passageway toward a dispensing outlet. Material may be distributed from the first flow passageway into the second flow passageway. The method and apparatus may generally maintain the same flow properties of the material at a point before and after the connection of the first flow passageway and the second flow passageway. The flow properties of the material may be altered proximate to the outlet.

17 Claims, 4 Drawing Sheets

U.S. PATENT DOCUMENTS

| | | |
|---|---|---|
| 3,605,232 A | 9/1971 | Hines |
| 3,649,730 A | 3/1972 | Lachenmayer et al. |
| 3,677,676 A | 7/1972 | Hegler |
| 3,725,565 A | 4/1973 | Schmidt |
| 3,819,292 A | 6/1974 | Wentworth |
| 3,824,886 A | 7/1974 | Hegler |
| 3,837,364 A | 9/1974 | Jenner |
| 3,869,235 A | 3/1975 | Moore |
| 3,944,641 A | 3/1976 | Lemelson |
| 3,957,386 A | 5/1976 | Lupke |
| 4,042,661 A | 8/1977 | Cook |
| 4,113,411 A | 9/1978 | Terragni |
| 4,165,214 A | 8/1979 | Lupke et al. |
| 4,180,357 A | 12/1979 | Lupke |
| 4,218,164 A | 8/1980 | Lupke |
| 4,219,293 A | 8/1980 | Licht |
| 4,223,895 A | 9/1980 | Roberts, Jr. et al. |
| 4,230,157 A | 10/1980 | Larsen et al. |
| 4,262,162 A | 4/1981 | Plinke et al. |
| 4,281,981 A | 8/1981 | Feldman |
| 4,319,476 A | 3/1982 | Fuchs, Jr. |
| 4,352,701 A | 10/1982 | Shimba et al. |
| 4,377,545 A | 3/1983 | Hornbeck |
| 4,397,797 A | 8/1983 | Nojiri et al. |
| 4,402,658 A | 9/1983 | Larsen |
| 4,436,679 A | 3/1984 | Winstead |
| 4,439,130 A | 3/1984 | Dickhut et al. |
| 4,492,551 A | 1/1985 | Hegler et al. |
| 4,523,613 A | 6/1985 | Fouss et al. |
| 4,528,832 A | 7/1985 | Fuchs, Jr. |
| 4,534,923 A | 8/1985 | Lupke |
| 4,547,246 A | 10/1985 | Viriyayuthakorn et al. |
| 4,562,990 A | 1/1986 | Rose |
| 4,572,523 A | 2/1986 | Guettouche et al. |
| 4,588,546 A | 5/1986 | Feil et al. |
| 4,666,649 A | 5/1987 | Takubo et al. |
| 4,678,526 A | 7/1987 | Hawerkamp |
| 4,683,166 A | 7/1987 | Yuto et al. |
| 4,703,639 A | 11/1987 | Fuchs, Jr. |
| 4,756,339 A | 7/1988 | Buluschek |
| 4,779,651 A | 10/1988 | Hegler et al. |
| 4,789,327 A | 12/1988 | Chan et al. |
| 4,808,098 A | 2/1989 | Chan et al. |
| 4,846,660 A | 7/1989 | Drossbach |
| 4,849,113 A | 7/1989 | Hills |
| 4,854,416 A | 8/1989 | Lalikos et al. |
| 4,862,728 A | 9/1989 | Hardouin |
| 4,862,924 A | 9/1989 | Kanao |
| 4,900,503 A | 2/1990 | Hegler et al. |
| 4,906,496 A | 3/1990 | Hosono et al. |
| 4,970,351 A | 11/1990 | Kirlin |
| 5,045,254 A | 9/1991 | Peelman et al. |
| 5,058,934 A | 10/1991 | Brannon |
| 5,089,074 A | 2/1992 | Winter et al. |
| 5,124,109 A | 6/1992 | Drossbach |
| 5,129,428 A | 7/1992 | Winter et al. |
| 5,129,429 A | 7/1992 | Winter et al. |
| 5,129,685 A | 7/1992 | Engel |
| 5,145,545 A | 9/1992 | Winter et al. |
| 5,156,901 A | 10/1992 | Tanaka |
| 5,192,834 A | 3/1993 | Yamanishi et al. |
| 5,222,288 A | 6/1993 | Thomas |
| 5,228,479 A | 7/1993 | Thomas |
| 5,256,233 A | 10/1993 | Winter et al. |
| 5,262,109 A | 11/1993 | Cook |
| 5,275,544 A | 1/1994 | Marlowe |
| 5,279,332 A | 1/1994 | Winter et al. |
| 5,314,553 A | 5/1994 | Hashimoto et al. |
| 5,330,600 A | 7/1994 | Lupke |
| 5,346,384 A | 9/1994 | Hegler et al. |
| 5,372,774 A | 12/1994 | Lupke |
| 5,383,497 A | 1/1995 | Winter et al. |
| 5,383,998 A | 1/1995 | Lupke |
| 5,391,334 A | 2/1995 | Enomoto |
| 5,394,904 A | 3/1995 | Winter et al. |
| 5,441,083 A | 8/1995 | Korsgaard |
| 5,460,771 A | 10/1995 | Mitchell et al. |
| 5,462,090 A | 10/1995 | Winter et al. |
| 5,466,402 A | 11/1995 | Lupke |
| 5,469,892 A | 11/1995 | Noone et al. |
| 5,472,659 A | 12/1995 | Hegler et al. |
| 5,472,746 A | 12/1995 | Miyajima et al. |
| 5,522,718 A | 6/1996 | Dietrich |
| 5,531,952 A | 7/1996 | Hatfield |
| 5,545,369 A | 8/1996 | Lupke |
| 5,572,917 A | 11/1996 | Truemner et al. |
| 5,608,637 A | 3/1997 | Wang et al. |
| 5,620,722 A | 4/1997 | Spina |
| 5,649,713 A | 7/1997 | Ledgerwood |
| 5,706,864 A | 1/1998 | Pfleger |
| 5,715,870 A | 2/1998 | Winter et al. |
| 5,759,461 A | 6/1998 | Jarvenkyla et al. |
| 5,773,044 A | 6/1998 | Dietrich et al. |
| 5,846,575 A * | 12/1998 | Lupke et al. ............. 425/192 R |
| 5,848,618 A | 12/1998 | Guest |
| 5,894,865 A | 4/1999 | Winter et al. |
| 5,901,754 A | 5/1999 | Elsässer et al. |
| 5,904,643 A | 5/1999 | Seeberger et al. |
| 5,909,908 A | 6/1999 | Furuse |
| 5,912,023 A | 6/1999 | Katoh et al. |
| 5,975,143 A | 11/1999 | Järvenkylä et al. |
| 5,976,298 A | 11/1999 | Hegler et al. |
| 6,000,434 A | 12/1999 | Winter et al. |
| 6,016,848 A | 1/2000 | Egres, Jr. |
| 6,039,082 A | 3/2000 | Winter et al. |
| 6,045,347 A * | 4/2000 | Hegler ............. 425/133.1 |
| 6,062,268 A | 5/2000 | Elsässer et al. |
| 6,082,741 A | 7/2000 | Gregoire et al. |
| 6,161,591 A | 12/2000 | Winter et al. |
| 6,186,182 B1 | 2/2001 | Yoon |
| 6,199,592 B1 | 3/2001 | Siferd et al. |
| 6,240,969 B1 | 6/2001 | Wildermuth |
| 6,335,101 B1 | 1/2002 | Haeger et al. |
| 6,399,002 B1 | 6/2002 | Lupke et al. |
| 6,405,974 B1 | 6/2002 | Herrington |
| 6,461,078 B1 | 10/2002 | Presby |
| 6,491,994 B1 | 12/2002 | Kito et al. |
| 6,524,519 B1 | 2/2003 | Ohba et al. |
| 6,555,243 B2 | 4/2003 | Flepp et al. |
| 6,591,871 B2 | 7/2003 | Smith et al. |
| 6,607,010 B1 | 8/2003 | Kashy |
| 6,631,741 B2 | 10/2003 | Katayama et al. |
| 6,645,410 B2 | 11/2003 | Thompson |
| 6,682,677 B2 | 1/2004 | Lobovsky et al. |
| 6,696,011 B2 | 2/2004 | Yun et al. |
| 6,719,302 B2 | 4/2004 | Andrick |
| 6,787,092 B2 | 9/2004 | Chan et al. |
| 6,848,464 B2 | 2/2005 | Ransom |
| 6,848,478 B2 | 2/2005 | Nagai |
| 6,854,168 B2 | 2/2005 | Booms et al. |
| 6,933,028 B2 | 8/2005 | Milhas |
| 6,935,378 B2 | 8/2005 | Ikemoto et al. |
| 6,955,780 B2 | 10/2005 | Herrington |
| 7,074,027 B2 | 7/2006 | Starita |
| 7,114,944 B2 | 10/2006 | Wolfe et al. |
| 7,118,369 B2 | 10/2006 | Dietrich et al. |
| 7,122,074 B2 | 10/2006 | Kim |
| 7,140,859 B2 | 11/2006 | Herrington |
| 7,156,128 B1 | 1/2007 | Kanao |
| 7,185,894 B2 | 3/2007 | Kish et al. |
| 7,347,225 B2 | 3/2008 | Nobileau |
| 2002/0179232 A1 | 12/2002 | Thompson |
| 2004/0146696 A1 | 7/2004 | Jones |
| 2004/0187946 A1 | 9/2004 | Herrington |
| 2004/0241368 A1 | 12/2004 | Iwata et al. |
| 2005/0118295 A1* | 6/2005 | Sagar et al. ............. 425/133.1 |
| 2006/0293159 A1 | 12/2006 | Neubauer |
| 2007/0204929 A1 | 9/2007 | Jarvenkyla |
| 2008/0118596 A1 | 5/2008 | Hetzner et al. |

FOREIGN PATENT DOCUMENTS

| | | |
|---|---|---|
| DE | 2 042 031 | 5/1972 |
| DE | 2 413 878 | 2/1976 |
| DE | 2 403 618 | 12/1980 |
| DE | 2 804 540 C2 | 1/1984 |
| DE | 297 06 045 | 6/1997 |
| EP | 0 041 252 | 12/1981 |

| | | |
|---|---|---|
| EP | 0 096 957 B1 | 5/1989 |
| EP | 0 385 465 A2 | 3/1990 |
| EP | 0 385 465 B1 | 3/1990 |
| EP | 0 581 064 A1 | 7/1993 |
| EP | 0 726 134 B1 | 2/1996 |
| EP | 0 543 243 B1 | 2/1997 |
| EP | 0 600 214 B1 | 3/1998 |
| EP | 0 890 770 A2 | 5/1998 |
| EP | 0 890 770 B1 | 5/1998 |
| EP | 1 293 718 A2 | 3/2003 |
| EP | 0 600 214 B2 | 4/2006 |
| FR | 1 486 473 | 6/1967 |
| GB | 1 148 277 | 4/1969 |
| GB | 2 300 684 | 11/1996 |
| JP | 56144943 | 11/1981 |
| JP | 57160518 | 10/1982 |
| JP | 58168422 | 10/1983 |
| JP | 59 026224 | 2/1984 |
| JP | 59114027 | 6/1984 |
| JP | 61135416 | 6/1986 |
| JP | 06 64062 | 3/1994 |
| JP | 08-258175 | 10/1996 |
| JP | 08-258176 | 10/1996 |
| JP | 08 267128 | 10/1996 |
| JP | 2003062891 | 3/2003 |
| WO | WO 85/00140 | 1/1985 |
| WO | WO 98/12046 | 3/1998 |
| WO | WO 01/79737 A1 | 10/2001 |
| WO | WO 2004/094888 A1 | 11/2004 |

OTHER PUBLICATIONS

*Modern Plastics Worldwide*, Apr. 2008 edition, p. 35, "Device offers alternative for constant flow filtration."
U.S. Appl. No. 11/078,323, filed Mar. 14, 2005, entitled "Corrugated Pipe with Outer Layer".
Non-final Office Action dated Jul. 3, 2007, in U.S. Appl. No. 11/078,323.
Final Office Action dated Dec. 27, 2007, in U.S. Appl. No. 11/078,323.
Non-final Office Action dated May 29, 2008, in U.S. Appl. No. 11/078,323.

\* cited by examiner

PIPE EXTRUSION DIE FLOW PATH APPARATUS AND METHOD

RELATED APPLICATIONS

The present disclosure claims the right to priority based on U.S. Provisional Patent Application No. 60/903,286 filed Feb. 26, 2007.

FIELD OF THE INVENTION

The present invention relates to a method and apparatus for producing pipes, and more particularly, to a pipe extrusion die having an improved flow path design.

BACKGROUND OF THE INVENTION

Materials, such as thermoplastic resins, have been used to form pipes including, for example, those having a multilayer design. In some cases, the materials are heated, melted, or extruded, such as through the use of a die having a predetermined shape. One known example of a pipe extrusion die 100 is shown in FIG. 1. As illustrated, melted plastic may travel through a distributor portion 104 of the pipe extrusion die 100. From the distributor portion 104, the material may travel through a transition area 106 and then through a flair-out portion 108 of an extrusion nozzle 110. During this outward movement through the flair-out portion 108, the melted plastic material may flow through a flow passage 118, which may be defined by several die components, such as flow pins 112 and flow bushings 114. As the material flows outward toward the end 116 of the extrusion nozzle 110, the width of the flow passage 118 gradually decreases over its length.

As the material flows towards the transition area 106, such as between points $A_1$ and $B_1$, the flow properties of the material may remain constant. These flow properties which include, for instance, shear rate and shear stress, may be nearly identical. When the material flows toward point $C_1$, however, the flow properties of the material may be much different than at point $B_1$. This substantial change in material flow properties can cause variations in flow performance to occur as the material flows outward to a larger diameter, such as within the flair-out portion 108 between points $B_1$ and $C_1$. Flow variations also may occur as the material flows through a gradually decreasing passage, such as through flow passage 118.

The prior art extrusion die designs suffer from several deficiencies. For instance, conventional extrusion die designs fail to adequately control material flow properties, such as shear rate and shear stress. As a result, the end product is produced at higher temperatures and pressures, and has greater material thickness variation. Higher temperatures and pressures result in increased production costs. Greater material thickness variation necessitates an increase in raw material usage and, therefore, results in further increases in production costs. The inability to adequately control material flow properties in the prior art thus reduces the efficiency and increases the cost of the extrusion process.

Accordingly, it is desirable to provide an improved extrusion die apparatus and process for improving the efficiency and cost of the extrusion process.

SUMMARY OF THE INVENTION

In accordance with one disclosed exemplary embodiment, a pipe extrusion die apparatus may include a first flow passageway having a first cross-sectional area and extending along a first flow direction, and a second flow passageway connected to the first flow passageway. The second flow passageway may have a second cross-sectional area substantially the same as the first cross-sectional area of the first flow passageway and extending along a second flow direction different from the first flow direction of the first flow passageway. The apparatus may also include a conical passageway extending from the second flow passageway toward a dispensing outlet.

In accordance with another disclosed exemplary embodiment, a multilayer pipe extrusion die apparatus may include a first flow passageway having a first cross-sectional area and extending along a first flow direction. The first flow passageway may be defined by an inner tube structure and a middle tube structure. The apparatus may include a second flow passageway connected to the first flow passageway. The second flow passageway may have a second cross-sectional area substantially the same as the first cross-sectional area of the first flow passageway. The second flow passageway may extend along a second flow direction different from the first flow direction of the first flow passageway. The second flow passageway may be defined by a first wall pin and a first wall bushing. The apparatus may further include a first conical passageway extending from the second flow passageway toward a first dispensing outlet. In addition, the apparatus may include a third flow passageway having a third cross-sectional area and extending along a third flow direction. The third flow passageway may be defined by the middle tube structure and an outer tube structure. The apparatus may also include a fourth flow passageway connected to the third flow passageway. The fourth flow passageway may have a fourth cross-sectional area substantially the same as the third cross-sectional area of the third flow passageway. The fourth flow passageway may extend along a fourth flow direction different from the third flow direction of the third flow passageway. The fourth flow passageway may be defined by a second wall pin and a second wall bushing. Finally, the apparatus may include a second conical passageway extending from the fourth flow passageway toward a second dispensing outlet.

In accordance with another aspect of the present invention, a method for distributing material through a pipe extrusion die apparatus may include providing a connection between a first flow passageway, which has a first cross-sectional area and extends along a first flow direction, and a second flow passageway, which has a second cross-sectional area substantially the same as the first cross-sectional area of the first flow passageway and extending along a second flow direction different from the first flow direction. The method may also include providing a restricted passageway extending from the second flow passageway toward a dispensing outlet, and distributing material through the connection between the first flow passageway and the second flow passageway while maintaining substantially the same flow properties of the material. The method may further include distributing material through the restricted passageway while altering the flow properties of the material. The material flow properties of the material may include a shear rate and/or a shear stress of the material.

According to another exemplary disclosed embodiment, a method for distributing material through a pipe extrusion die apparatus may include connecting a first flow passageway, having a first cross-sectional area and extending along a first flow direction, to a second flow passageway, having a second cross-sectional area substantially the same as the first cross-sectional area of the first flow passageway, to provide a second flow direction different from the first flow direction of the first flow passageway. A conical passageway may extend from the second flow passageway toward a dispensing outlet. The method may also include distributing material from the first flow passageway into the second flow passageway and generally maintaining the same flow properties of the material at a point before and after the connection of the first flow passageway and the second flow passageway. The flow properties of the material may be altered proximate to the outlet.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate embodiments of the invention and together with the description, serve to explain the principles of the invention.

As such, those skilled in the art will appreciate that the conception upon which this disclosure is based may readily be utilized as a basis for designing other structures, methods and systems for carrying out the several purposes of the present invention. It is important, therefore, that the claims be regarded as including such equivalent constructions insofar as they do not depart from the spirit and scope of the present invention.

DESCRIPTION OF THE EXEMPLARY EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 2:
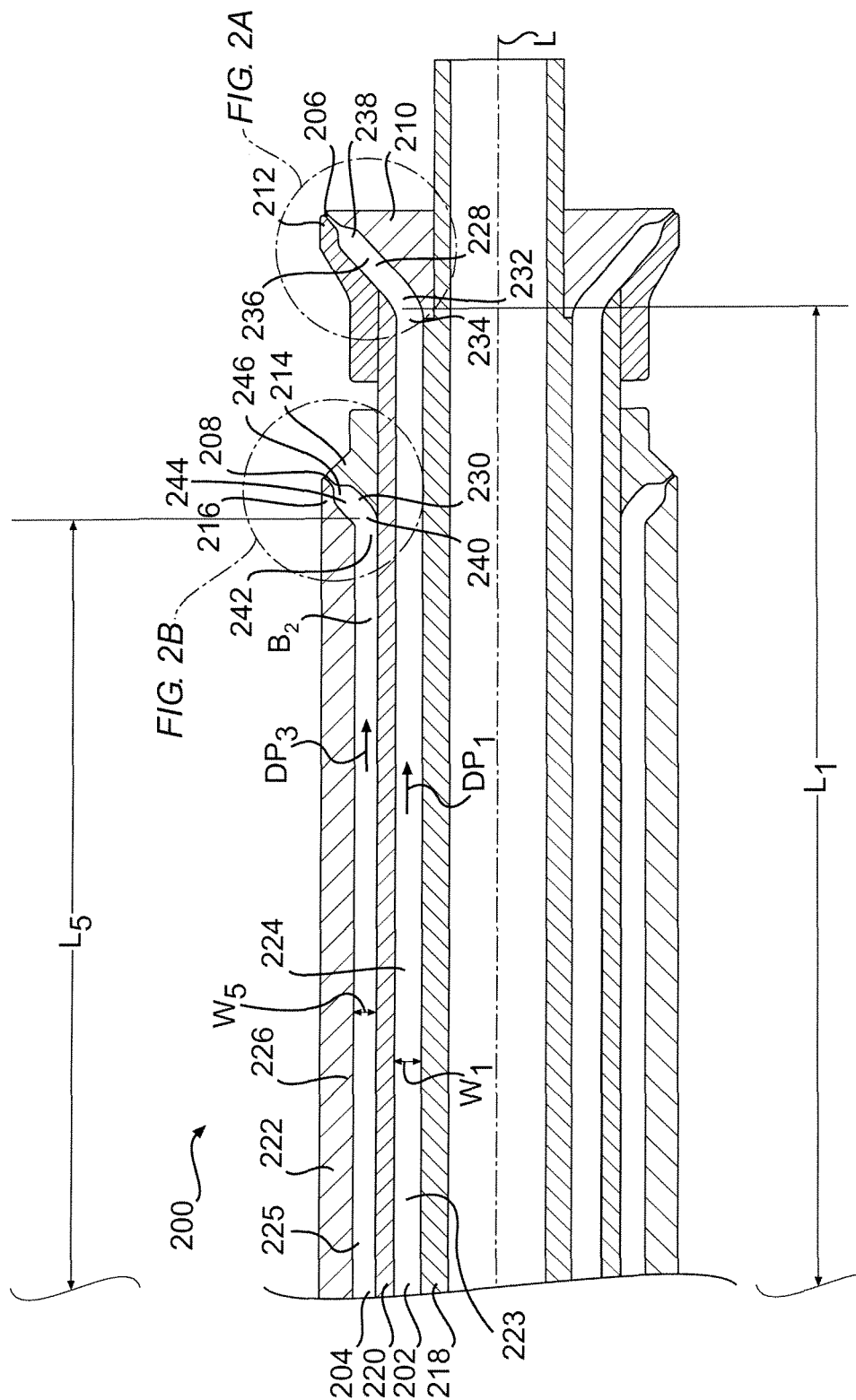
FIG. 2 is a cross-sectional view illustrating a multi-wall pipe extrusion die consistent with an embodiment of the invention.

Referring to the drawings, FIG. 2 illustrates a multi-wall pipe extrusion die 200. While the present disclosure includes embodiments that relate to a multi-wall pipe extrusion die 200, other pipe extrusion dies, including, for example, a single pipe extrusion die, may be utilized. The multi-wall pipe extrusion die 200 of FIG. 2 may be used in producing a wide variety of multi-layer pipes including, for example, pipes formed from thermoplastic materials. In one embodiment, an inner layer inlet 202 may be provided between an inner tube 218 and a middle tube 220 of the multi-wall pipe extrusion die 200. A melted material, such as, for example, a melted high density polyethylene, may be introduced into the inner layer inlet 202 and travel through a first passageway 223 such as an inner layer nozzle body portion 224. The first passageway 223 may have a first width $W_1$ over a prescribed length $L_1$. For instance, in one embodiment, the first width $W_1$ may be about 0.590 inches, and the prescribed length $L_1$ may be about 36.967 inches. The inner layer nozzle body portion 224 may cause the material to travel along a direction of production $DP_1$. The direction of production $DP_1$ may be substantially parallel to a longitudinal axis L of the multi-wall pipe extrusion die 200. In one embodiment, the direction of production $DP_1$ may be within plus or minus 10 degrees of longitudinal axis L of multi-wall pipe extrusion die 200. The inner layer nozzle body portion 224 may also facilitate substantially uniform distribution of the material flowing therethrough.

Figure 2A:
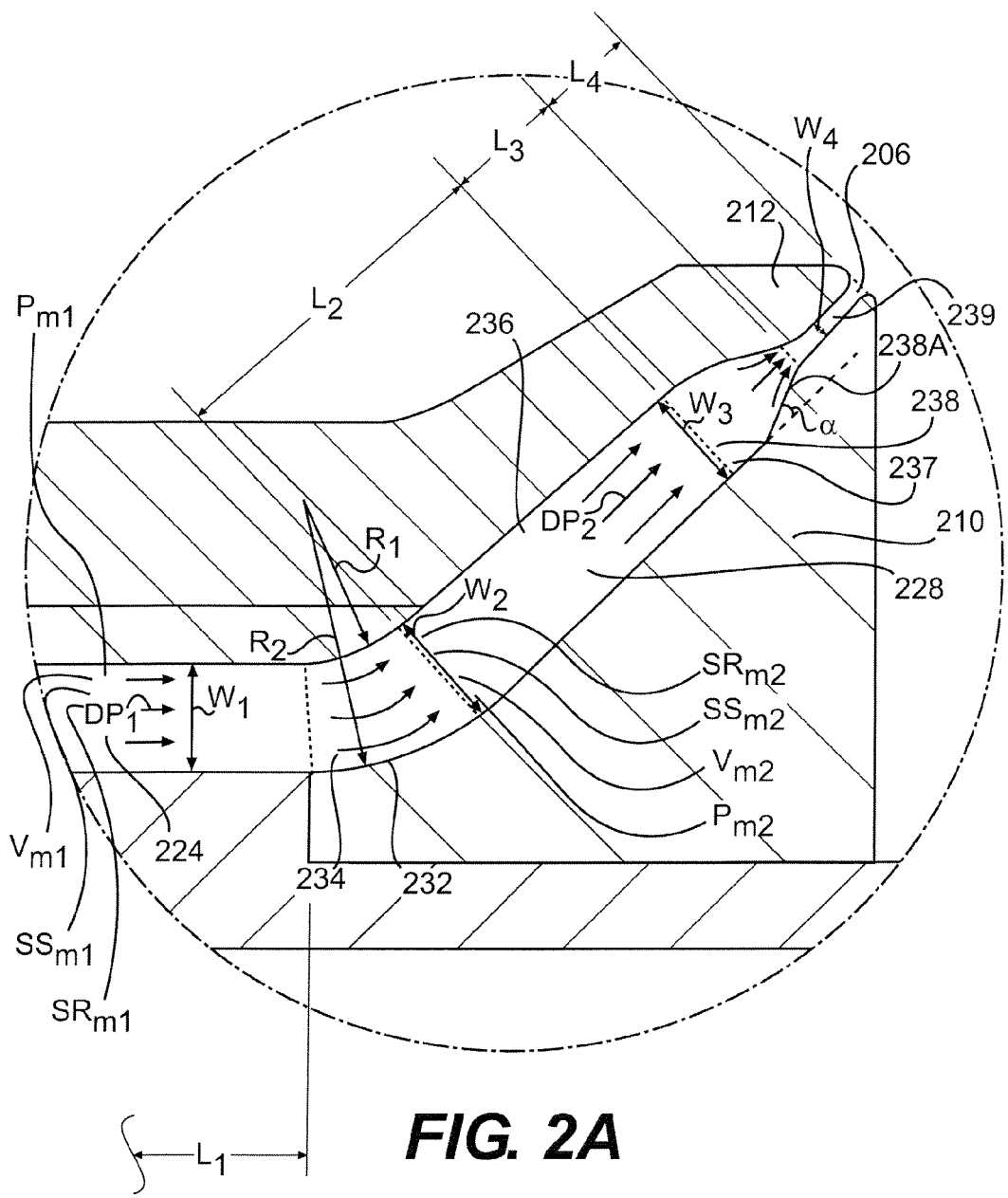
FIG. 2A is an enlarged view of the inner layer extrusion nozzle flair shown in FIG. 2.

An inner layer extrusion nozzle flair 228 may be connected to the inner layer nozzle body portion 224. Turning to FIG. 2A, the inner layer extrusion nozzle flair 228 may be defined, for example, between predetermined die components, such as an inner wall pin 210 and an inner wall bushing 212. Additionally, the inner layer extrusion nozzle flair 228 may be connected to the inner layer nozzle body portion 224 through a transition portion 232 of an inner layer transition area 234. The transition portion 232 may redirect the flow of material from the inner layer nozzle body portion 224 to the inner layer extrusion nozzle flair 228. This redirection may occur through a prescribed radius of curvature. In other words, the transition portion 232 may have a curved or bent shape to redirect the flow of material from the direction of production $DP_1$ to another direction of production $DP_2$. For example, one wall of the transition portion 232 may have curved or bent shape with a radius of curvature $R_1$. The radius of curvature R1 may be about 0.5 inches. Another wall of the transition portion 232 may have a similarly curved or bent shape with a radius of curvature $R_2$. The radius of curvature $R_2$ may not necessarily be the same as the radius of curvature $R_1$. For example, the radius of curvature $R_2$ may be about 0.75 inches. As a result, material may flow through the inner layer nozzle body portion 224, through the transition portion 232 of the inner layer transition area 234, and then into the inner layer extrusion nozzle flair 228.

The inner layer extrusion nozzle flair 228 may include several passageways that may be sized depending on the above mentioned variables and objectives. Specifically, the inner layer extrusion nozzle flair 228 may include a second flow passageway 236, a third flow passageway 237, and a fourth flow passageway 239. The second flow passage 236, the third flow passageway 237, and the fourth flow passageway 239, may each have widths $W_2$, $W_3$, and $W_4$ and lengths $L_2$, $L_3$, and $L_4$, respectively. For example, the widths $W_2$, $W_3$, and $W_4$ may be about 0.588, 0.390, and 0.056 inches, respectively, and the lengths $L_2$, $L_3$, and $L_4$ may be about 2.5, 0.290, and 0.348 inches, respectively. The width $W_2$ of the second flow passageway 236 may vary slightly, such as by decreasing, over its length $L_2$ defined between the inner layer transition area 234 and the third flow passageway 237.

The width $W_3$ of the third flow passageway 237 may vary over the length $L_3$. For example, the third flow passageway 237 may include a choke portion 238. In one embodiment, the choke portion 238 may extend over a distance less than half the distance over which the inner layer extrusion nozzle flair 228 extends. The choke portion 238 may have, for example, a symmetrical shape over its length $L_3$ defined between the second flow passageway 236 and the fourth flow passageway 239. The symmetrical shape may be any suitable shape, such as a conical shape, so long as it symmetrically restricts the flow of material as it travels along the length $L_3$. For instance, a side wall 238A of the choke portion 238 may form an angle α relative to a sidewall of the fourth flow passageway 239. Specifically, the angle α may be about 25 degrees relative to a sidewall of the fourth flow passageway 236.

The fourth flow passageway 239 may include a width $W_4$ over a length $L_4$. The length $L_4$ of the fourth flow passageway 239 may be defined between the third flow passageway 237 and an inner layer nozzle outlet 206. The width $W_4$ of the fourth flow passageway 239 may be substantially constant over its length $L_4$. Thus, the material flowing through the inner layer extrusion nozzle flair 228 may be extruded through an inner layer nozzle outlet 206.

In one preferred embodiment, the choke portion 238 may be disposed in relatively close proximity to an end of the inner layer extrusion nozzle flair 228 and the inner layer nozzle outlet 206. For example, the end of the choke portion 238 may be located approximately 0.5 inch away from the location of the inner layer nozzle outlet 206.

Similarly, returning to FIG. 2, an outer layer inlet 204 may be provided between the middle tube 220 and an outer tube 222 of the multi-wall pipe extrusion die 200. A melted material, such as, for example, a melted high density polyethylene, may be introduced into the outer layer inlet 204 and travel through a fifth passageway 225 such as an outer layer nozzle body portion 226. The fifth passageway 225 may have a fifth width $W_5$ over a prescribed length $L_5$. For instance, in one embodiment, the fifth width $W_5$ may be approximately 0.500 inches, and the prescribed length $L_5$ may be about 21.271 inches. The outer layer nozzle body portion 226 may cause the material to travel along a direction of production $DP_3$. The direction of production $DP_3$ may be substantially parallel to a longitudinal axis L of the multi-wall pipe extrusion die 200. In one embodiment, the direction of production $DP_3$ may be within plus or minus 10 degrees of longitudinal axis L of the multi-wall pipe extrusion die 200. The outer layer nozzle body portion 226 also may facilitate a substantially uniform distribution of the material flowing therethrough.

Figure 2B:
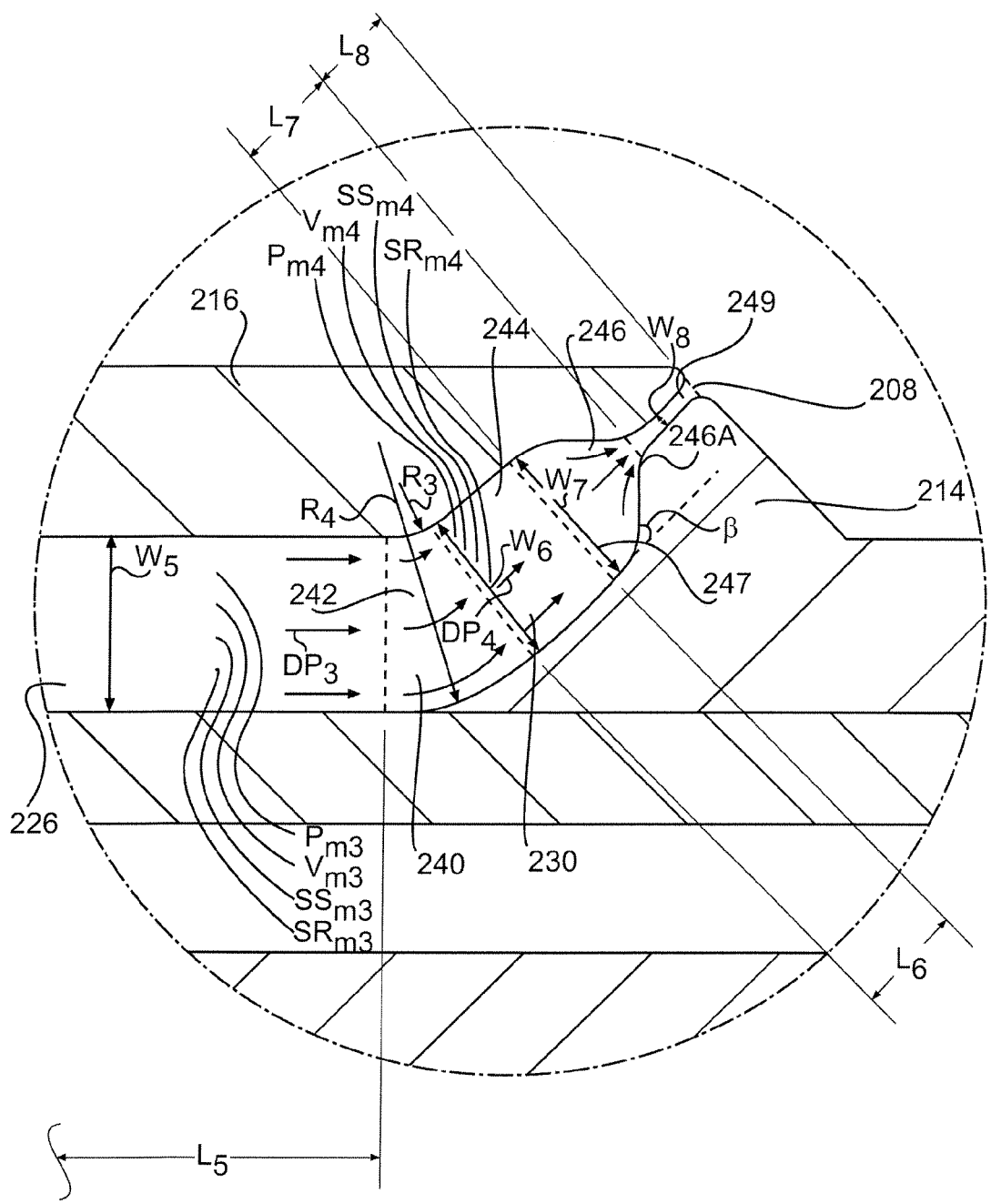
FIG. 2B is an enlarged view of the outer layer extrusion nozzle flair shown in FIG. 2.

An outer layer extrusion nozzle flair 230 may be connected to the outer layer nozzle body portion 226. Turning to FIG. 2B, the outer layer extrusion nozzle flair 230 may be defined, for example, between predetermined die components, such as an outer wall pin 214 and an outer wall bushing 216. Additionally, the outer layer extrusion nozzle flair 230 also may be connected to the outer layer nozzle body portion 226 through a transition portion 240 of an outer layer transition area 242. The transition portion 240 may redirect the flow of material from the outer layer nozzle body portion 226 to the outer layer extrusion nozzle flair 230. This redirection may occur through a prescribed radius of curvature. In other words, the transition portion 240 may have a curved or bent shape to redirect the flow of material from the direction of production $DP_3$ to another direction of production $DP_4$. For example, one wall of the transition portion 240 may have a curved or bent shape with a radius of curvature $R_3$. The radius of curvature $R_3$ may be approximately 0.25 inch. Another wall of the transition portion 240 may have a similarly curved or bent shape with a radius of curvature $R_4$. The radius of curvature $R_4$ may not necessarily the same as the radius of curvature $R_3$. For example, the radius of curvature $R_4$ may be about 0.75 inches. As a result, material may flow through the outer layer nozzle body portion 226, through the transition portion 240 of the outer layer transition area 242, and then into the outer layer extrusion nozzle flair 230.

The outer layer extrusion nozzle flair 230 may include several passageways that may be sized depending on the above mentioned variables and objectives. Specifically, the outer layer extrusion nozzle flair 230 may include a sixth flow passageway 244, a seventh flow passageway 247, and an eighth flow passageway 249. The sixth flow passageway 244, the seventh flow passageway 247, and the eighth flow passageway 249 may each have widths $W_6$, $W_7$, and $W_8$ and lengths $L_6$, $L_7$, and $L_8$, respectively. For example, the widths $W_6$, $W_7$, and $W_8$ may be about 0.422, 0.420, and 0.090 inches, respectively, and the lengths $L_6$, $L_7$, and $L_8$ may be about 0.313, 0.291, and 0.360 inches, respectively. The width $W_6$ of the sixth flow passageway 244 may vary slightly, such as by decreasing, over its length $L_6$ defined between the outer layer transition area 242 and the seventh flow passageway 247.

The width $W_7$ of the seventh flow passageway 247 may vary over the length $L_7$. For example, the seventh passageway 247, may include a choke portion 246. In one embodiment, the choke portion 246 may extend over a distance less than half the distance over which the outer layer extrusion nozzle flair 230 extends. The choke portion 246 may have, for example, a symmetrical shape over its length $L_7$, defined between the sixth flow passageway 244 and the eighth flow passageway 249. The symmetrical shape may be any suitable shape, such as a conical shape, so long as it symmetrically restricts the flow of material as it travels along the length $L_7$. For instance, a side wall 246A of the choke portion 246 may form an angle $\beta$ relative to a sidewall of the sixth flow passageway 244. Specifically, the angle $\beta$ may be about 30 degrees relative to a sidewall of the sixth flow passageway 244.

The eighth flow passageway 249 may include a width $W_8$ over a length $L_8$. The length $L_8$ of the eighth flow passageway 249 may extend between the seventh flow passageway 247 and an outer layer nozzle outlet 208. The width $W_8$ Of the eighth flow passageway 249 may be substantially constant over its length $L_8$. Thus, the material flowing through the outer layer extrusion nozzle flair 230 may be extruded through an outer layer nozzle outlet 208.

In a preferred embodiment, the choke portion 246 may be disposed in relatively close proximity to an end of the outer layer extrusion nozzle flair 230 and towards the outer layer nozzle outlet 208. For example, the end of the choke portion 246 may be located approximately 0.35 inches away from the location of the outer layer nozzle outlet 208.

These outlet portions 206, 208 may be sized such that the lengths of the outlet portions are 4 to 6 times their widths. Because of this, choke areas 238, 246 are needed between the extrusion nozzle flairs 228, 230 which have much lower (optimized) flow properties and the outlets 206, 208 which have much higher flow properties. Unlike the prior art choke areas, which typically extend over major portions of the flairs, the currently disclosed choke areas make up a small portion of the flairs and therefore allow selection of targeted flow properties. Because choke portions 238, 246 may be located proximate to outlets 206, 208 of the extrusion nozzle flairs 228, 230, respectively, and because choke portions 238, 246 may constrict the flows over a significantly shorter length than the prior art designs, a constant shear rate may be maintained along greater lengths of extrusion nozzle flairs 228, 230. Moreover, outlet portions 206, 208 may have high flow properties to obtain the correct material velocity and thickness needed to properly produce the end product. For example, a specific targeted shear stress may be chosen to minimize the resulting pressure and shear rates, without inducing thermal degradation of the material or other undesirable effects.

Figure 1:
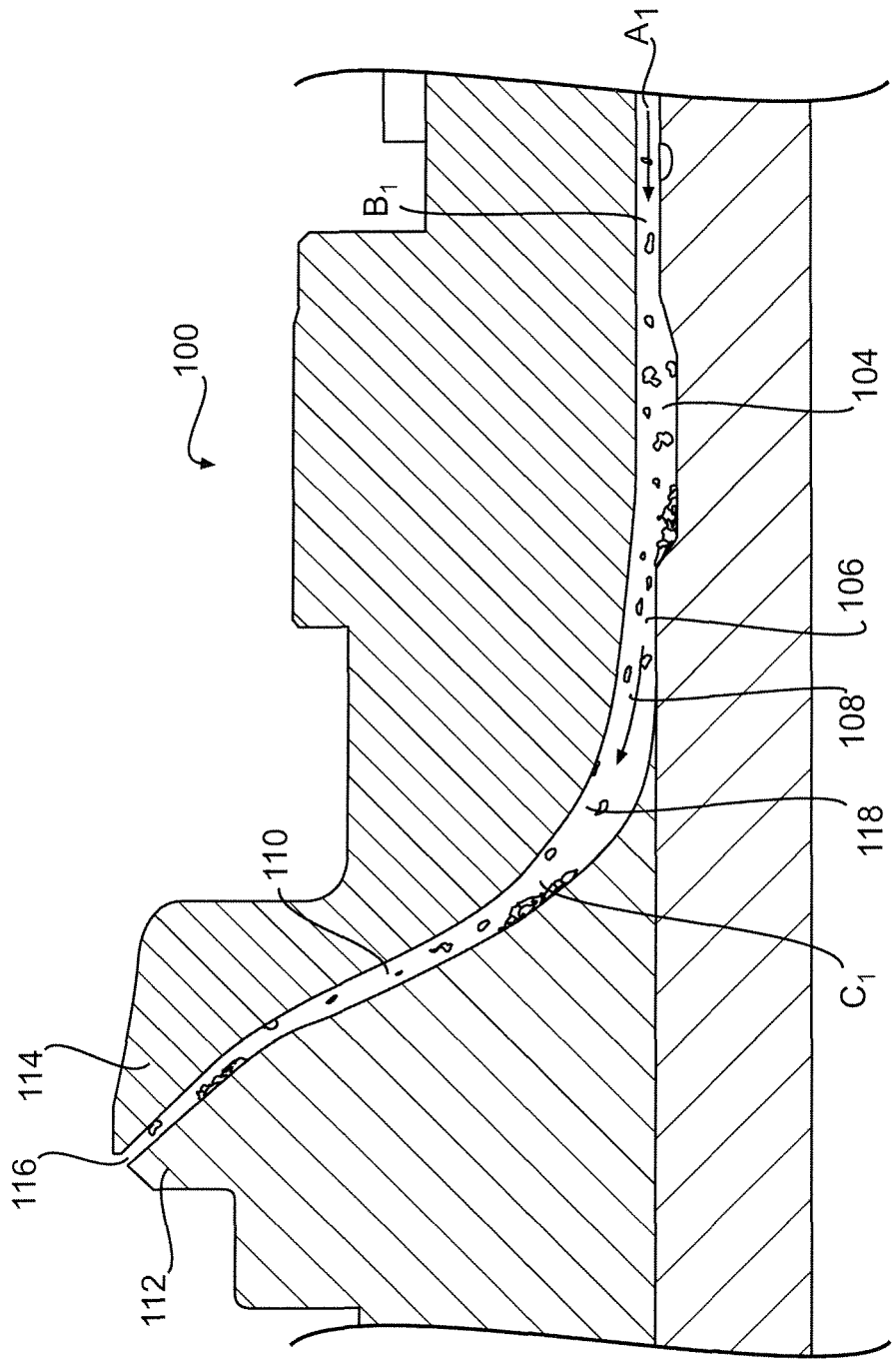
FIG. 1 is a cross-sectional view illustrating a conventional multi-wall pipe extrusion die consistent with the prior art.

Thus, unlike the conventional apparatus and method shown in FIG. 1, the improved extrusion die, which is described herein by reference to the exemplary embodiments illustrated in FIGS. 2, 2A, and 2B, may be configured to maintain substantially constant material flow properties along a majority of its length. Specifically, the radii of curvature for $R_1$, $R_2$, $R_3$, and $R_4$, and sizing of the inner layer nozzle flair 228 and outer layer nozzle flair 230 may be based on maintaining substantially constant flow properties, such as shear stress and shear rate, at the walls of the nozzle body portions 224, 226, the extrusion nozzle flairs 228, 230, and the transition portions 232, 240.

For instance, as shown in the Figs., the disclosed embodiment may maintain substantially constant material flow properties as the material travels from the inner layer nozzle body portion 224, through the transition portion 232 of the inner layer transition area 234, and into the second flow passageway 236. Specifically, the shear stress $SS_{m1}$ and/or the shear rate $SR_{m1}$ of the material flowing from the inner layer nozzle body portion 224 may be substantially the same as the shear stress $SS_{m2}$ and/or shear rate $SR_{m2}$, respectively, of the material in the second flow passageway 236 after the material flows around the transition portion 232 of the inner layer transition area 234. In one embodiment, the shear rate may not change more than 50%. For example, if the optimum shear rate at the walls is 10 1/s in the inner layer nozzle body portion 224, the shear rate at the walls in the transition portion 232 and the second flow passageway 236 may not exceed 15 1/s or drop below 5 1/s. Similarly, if shear stress is used as the flow property of principal interest, it may not change by more than 20%. For example, if the optimum shear stress at the walls is 5 psi in the inner layer nozzle body portion 224, the shear stress at the walls in the transition portion 232 and the second flow passageway 236 may not exceed 6 psi or drop below 4 psi.

Likewise, the exemplary embodiments disclosed herein may maintain substantially constant material flow properties as the material travels from the outer layer nozzle body portion 226, through the transition portion 240 of the outer layer transition area 242, and into the sixth flow passageway 244. Specifically, the shear stress $SS_{m3}$ and/or the shear rate $SR_{m3}$ of the material flowing from the outer layer nozzle body portion 226 may be substantially the same as the shear stress $SS_{m4}$ and/or the shear rate $SR_{m4}$, respectively, of the material in the sixth flow passageway 244 after the material flows around the transition portion 240 of the outer layer transition area 242. In one embodiment, the shear rate may not change more than 50%. For example, if the optimum shear rate at the walls is 10 1/s in the outer layer nozzle body portion 226, the shear rate at the walls in the transition portion 240 and the sixth flow passageway 244 may not exceed 15 1/s or drop below 5 1/s. Similarly, if shear stress is used as the flow property of principal interest, it may not change by more than 20%. For example, if the optimum shear stress at the walls is 5 psi in the outer layer nozzle body portion 226, the shear stress at the walls in the transition portion 240 and the sixth flow passageway 244 may not exceed 6 psi or drop below 4 psi.

Numerous mathematical methods may be used to calculate the approximate shear stress or shear rate at the walls of a flow channel. Equations, such as those for flow across rectangular or annular cross-sections, or combinations thereof, may be used to develop approximations of these values. For example, the shear rate of a Newtonian fluid in an annular shape may be estimated according to Eq. 1 below.

$$ShearRate = \frac{(6 \times V)}{(\pi \times D \times H^2)} \qquad \text{Eq. 1}$$

wherein:
V is the volumetric flow rate, in unit volume per unit time;
D is the average diameter given by (OD+ID)/2; and,
H is the average gap given by (OD−ID)/2.

Various software packages, such as, for example, Compuplast®, may also be used to calculate an approximate value for shear stress at the walls of a flow channel along with numerous other properties such as pressure and shear rate. These and other methods and sources will become apparent to one of ordinary skill in the art.

Accordingly, extrusion nozzle flairs 228, 230 may be designed to achieve a minimum amount of shear rate (i.e., an "optimum shear rate") that is just high enough to avoid thermal degradation of the material. Such optimized shear rates provide a minimum allowable pressure drop over a majority of the extrusion nozzle flairs 228, 230. By minimizing the pressure drop, a reduction in melt temperatures, and more uniform material distribution may be obtained. In one preferred embodiment, the pipe extrusion die of the present invention may also allow material to adequately recover from any build-up points or flow inhibitions. In other words, the material may propagate more easily in a predetermined flow direction around obstacles such as corners, bends, thermally degraded material build up, or changes in diameter. The material within the disclosed pipe extrusion die may further flow more readily in a single or multiple directions to produce a more consistent uniform flow characteristic. Additional cost benefits may also be realized, for example, by reducing or eliminating the amount of die adjustments that may be necessary to compensate for material build-up within a pipe extrusion die system. This may include utilizing one or more materials from a single or multiple sources. Furthermore, an improvement in distribution of extruded material may produce a more consistent pipe structure, i.e., a pipe structure that may be less susceptible to thickness variations due to poor distribution of extruded material.

Moreover, the sizing may be dependent on variables including the type of material used and the desired final product dimensions. As an example, for most thermoplastic materials, the sizing may be performed to attain a targeted shear stress between 4 and 10 psi. For a thermally stable material, such as fractional melt high density polyethylene ("HDPE"), the targeted shear stress may be much lower than for a thermally less stable material, such as most grades of polyvinylchloride ("PVC"). Other materials contemplated for use in the present extrusion die, and upon which sizing may be dependent, may include, for example, propylene and ethylene. For instance, in some embodiments, the aforementioned materials may have different flow characteristics, such as those provided by a five or six melt polypropylene or PVC.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A multilayer pipe extrusion die apparatus comprising:
a first flow passageway having a first cross-sectional area and extending along a first flow direction parallel to a pipe production direction, the first cross-sectional area being substantially unchanged over the length of the first flow passageway;
a second flow passageway connected to the first flow passageway, the second flow passageway having a second cross-sectional area substantially the same as the first cross-sectional area of the first flow passageway and extending along a second flow direction extending radially-outward from the first flow direction of the first flow passageway; and a frusto-conical passageway extending from the second flow passageway toward a third flow passageway downstream the frusto-conical passageway, wherein the third flow passageway extends to a dispensing outlet and includes a substantially constant width over a length of the third passageway;

wherein the frusto-conical passageway is configured to choke the flow of melted material flowing from the first and second flow passageways substantially proximate to the dispensing outlet, to maintain substantially constant material flow properties along the first and second flow passageways.

2. The apparatus of claim 1, wherein the frusto-conical passageway includes a first portion having a cross-sectional area substantially equal to the second cross-sectional area of the second flow passageway and a second portion having a cross-sectional area substantially equal to a cross-sectional area of the dispensing outlet.

3. The apparatus of claim 1, wherein the frusto-conical passageway extends over a distance less than half the distance over which the second flow passageway extends.

4. The apparatus of claim 1, wherein the second flow passageway is defined by a wall pin and a wall bushing.

5. The apparatus of claim 1, further comprising:
a fourth flow passageway having a fourth cross-sectional area and extending along a fourth flow direction;
a fifth flow passageway connected to the fourth flow passageway, the fifth flow passageway having a fifth cross-sectional area substantially the same as the fourth cross-sectional area of the fourth flow passageway and extending along a fifth flow direction different from the fourth flow direction of the fourth flow passageway; and
a second frusto-conical passageway extending from the fifth flow passageway toward a second dispensing outlet.

6. The apparatus of claim 5, wherein the second frusto-conical passageway includes a first portion having a cross-sectional area substantially equal to the fifth cross-sectional area of the fifth flow passageway and a second portion having a cross-sectional area substantially equal to a cross-sectional area of the second dispensing outlet.

7. The apparatus of claim 5, wherein the second frusto-conical passageway extends over a distance less than half the distance over which the fifth flow passageway extends.

8. The apparatus of claim 5, wherein the fifth flow passageway is defined by a second wall pin and a second wall bushing.

9. The apparatus of claim 5, wherein the first flow passageway is defined by an inner tube structure and a middle tube structure and the fourth flow passageway is defined by the middle tube structure and an outer tube structure.

10. An extrusion die apparatus comprising:
a first flow passageway having a first cross-sectional area and extending along a first flow direction, the first cross-sectional area being unchanged over the length of the first flow passageway;
a second flow passageway connected to the first flow passageway, the second flow passageway having a second cross-sectional area substantially the same as the first cross-sectional area of the first flow passageway and extending along a second flow direction different from the first flow direction of the first flow passageway;
a first frusto-conical passageway extending from the second flow passageway toward a third flow passageway downstream the frusto-conical passageway, wherein the third flow passageway extends to a first dispensing outlet and includes a substantially constant width over a length of the third passageway;
a fourth flow passageway having a fourth cross-sectional area and extending along a fourth flow direction, the fourth cross-sectional area being unchanged over the length of the fourth flow passageway and geometrically concentric with the first flow passageway;
a fifth flow passageway connected to the fourth flow passageway, the fifth flow passageway having a fifth cross-sectional area substantially the same as the fourth cross-sectional area of the fourth flow passageway and extending along a fifth flow direction different from the fourth flow direction of the fourth flow passageway, the fifth cross-sectional area being geometrically concentric with the second flow passageway; and
a second frusto-conical passageway extending from the fifth flow passageway toward a second dispensing outlet;
wherein the first and second frusto-conical passageways are configured to choke the flow of melted material flowing from the second and fifth flow passageways substantially proximate to the first and second dispensing outlets, to maintain substantially constant material flow properties along the second and fifth flow passageways.

11. The apparatus of claim 10, wherein the first frusto-conical passageway includes a first portion having a cross-sectional area substantially equal to the second cross-sectional area of the second flow passageway and a second portion having a cross-sectional area substantially equal to a cross-sectional area of the first dispensing outlet.

12. The apparatus of claim 10, wherein the second frusto-conical passageway includes a first portion having a cross-sectional area substantially equal to the fifth cross-sectional area of the fifth flow passageway and a second portion having a cross-sectional area substantially equal to a cross-sectional area of the second dispensing outlet.

13. The apparatus of claim 10, wherein the first flow passageway is defined by an inner tube structure and a middle tube structure, and the fourth flow passageway is defined by the middle tube structure and an outer tube structure.

14. The apparatus of claim 10, wherein the second flow passageway is defined by a first wall pin and a first wall bushing.

15. The apparatus of claim 14, wherein the fifth flow passageway is defined by a second wall pin and a second wall bushing.

16. The apparatus of claim 10, wherein the first frusto-conical passageway extends over a distance less than half a distance over which the second flow passageway extends.

17. The apparatus of claim 10, wherein the second frusto-conical passageway extends over a distance less than half a distance over which the fifth flow passageway extends.

* * * * *